(12) United States Patent
Hong et al.

(10) Patent No.: US 10,483,754 B2
(45) Date of Patent: Nov. 19, 2019

(54) FAULT DETECTION AND LOCATION IN NESTED MICROGRIDS

(71) Applicant: ABB Schweiz AG, Baden (CH)

(72) Inventors: Junho Hong, Cary, NC (US); Anil Kondabathini, Apex, NC (US); Dmitry Ishchenko, Cary, NC (US)

(73) Assignee: ABB Schweiz AG, Baden (CH)

( * ) Notice: Subject to any disclaimer, the term of this patent is extended or adjusted under 35 U.S.C. 154(b) by 174 days.

(21) Appl. No.: 15/655,378

(22) Filed: Jul. 20, 2017

(65) Prior Publication Data

US 2018/0316184 A1 Nov. 1, 2018

Related U.S. Application Data

(60) Provisional application No. 62/492,680, filed on May 1, 2017.

(51) Int. Cl.
| | |
|---|---|
| *H02H 7/26* | (2006.01) |
| *H02H 7/28* | (2006.01) |
| *G05B 15/02* | (2006.01) |
| *H02J 3/06* | (2006.01) |
| *H02J 3/14* | (2006.01) |
| *H02J 3/00* | (2006.01) |

(52) U.S. Cl.
CPC ............ *H02H 7/28* (2013.01); *G05B 15/02* (2013.01); *H02H 7/262* (2013.01); *H02J 3/06* (2013.01); *H02J 3/14* (2013.01); *H02J 2003/001* (2013.01)

(58) Field of Classification Search
None
See application file for complete search history.

(56) References Cited

U.S. PATENT DOCUMENTS

| | | |
|---|---|---|
| 9,300,134 B2 | 3/2016 | Lin et al. |
| 2008/0077336 A1 | 3/2008 | Fernandes |
| 2010/0287419 A1 | 11/2010 | Saikkonen |

(Continued)

OTHER PUBLICATIONS

IEEE Standard for Interconnecting Distributed Resources with Electric Power Systems; IEEE Standards Coordinating Committee 21; May 20, 2014; 16 pgs.; New York, New York USA.

(Continued)

*Primary Examiner* — Paul B Yanchus, III
(74) *Attorney, Agent, or Firm* — Taft Stettinius & Hollister LLP; J. Bruce Schelkopf

(57) ABSTRACT

Unique systems, methods, techniques and apparatuses of a power grid control system. One exemplary embodiment is a microgrid comprising a plurality of switching devices, a plurality of distribution line segments, a plurality of measuring devices, each measuring device corresponding to one of the plurality of switching devices, and a network controller. The network controller is configured to: receive measurements from the plurality of measurement devices, determine a fault is occurring within the microgrid using the measurements, assign a topology classification to each of the plurality of distribution line segments, assign a proximity classification to each of the plurality of distribution line segments, determine fault location using the topology classification and the proximity classification, and isolate the fault by transmitting open commands to the two switching devices of the plurality of switching devices closest to the fault.

20 Claims, 10 Drawing Sheets

(56) References Cited

U.S. PATENT DOCUMENTS

| | | | |
|---|---|---|---|
| 2012/0265360 A1 | 10/2012 | Smit | |
| 2013/0015703 A1* | 1/2013 | Rouse | H02J 3/38 |
| | | | 307/18 |
| 2013/0073100 A1 | 3/2013 | Seeley | |
| 2013/0286521 A1* | 10/2013 | Park | H02H 3/066 |
| | | | 361/57 |
| 2015/0134135 A1 | 5/2015 | Wong et al. | |
| 2015/0261240 A1* | 9/2015 | Mokhtari | G05F 1/66 |
| | | | 700/291 |
| 2016/0190790 A1 | 6/2016 | Oudalov et al. | |
| 2016/0224045 A1 | 8/2016 | Wong et al. | |
| 2016/0254666 A1 | 9/2016 | Curtiss et al. | |

OTHER PUBLICATIONS

IEEE Standard for Interconnecting Distributed Resources with Electric Power Systems; Standards Coordinating Committee 21; Jul. 28, 2003; 27 pgs.; New York, New York USA.

Efficient Distributed Path Selection for Shared Restoration Connections; Guangzhi Li, Dongmei Wang, Charles Kalmanek, Robert Doverspike; IEEE INFOCOM 2002; 10 pgs.; Florham Park, New Jersey USA.

KTH Royal Institute of Technology School of Electrical Engineering; Nested Microgrids: Operation and Control Requirements; Sam Al-Attiyah; pp. 6-17; Stockholm, Sweden 2016.

IntelliTeam SG Automatic Restoration System; S&C Electric Company; Dec. 7, 2015; 8 pgs.; Available at: http://www.sandc.com/globalassets/sac-electric/documents/sharepoint/documents-all-documents/descriptive-bulletin-1044-34.pdf.

Introduction to Algorithms Second Edition; Thomas H. Cormen, Charles E. Leiserson, Ronald L. Rivest, Clifford Stein; Section 24; pp. 591-619; McGraw Hill Book Company 2002; New York, New York.

International Search Report and Written Opinion, PCT/US18/29576, dated Sep. 20, 2018, 12 pgs.

* cited by examiner

| Designation | Topological Description | Notes |
|---|---|---|
| Type 1 | Grid Connected |  |
| Type 2 | DER/Generator Only |  |
| Type 3 | Load Only/Segment Only |  |
| Type 4 | Load and Generator |  |
| Type 5 | Transformers and Other Devices |  |

500

US 10,483,754 B2

FAULT DETECTION AND LOCATION IN NESTED MICROGRIDS

CROSS REFERENCE TO RELATED APPLICATION

This application claims priority under 35 U.S.C. 119(e) from U.S. provisional patent application No. 62/492,680 filed on May 1, 2017, entitled "Nested Microgrid Control System" which is hereby incorporated by reference in its entirety.

BACKGROUND

The present disclosure relates generally to fault responsive control systems for a power grid. Fault detection and isolation is crucial to maintaining a healthy power grid. Extended exposure to fault currents can damage power grid components. The addition of distributed energy resources (DERs) to the power grid necessitates new means of fault detection and isolation. Whereas existing power grids with a radial distribution structure would only have fault current flowing in one direction, a power grid with DERs may have fault currents flowing in multiple directions from different power sources. Existing power grid control systems suffer from a number of shortcomings and disadvantages. There remain unmet needs including increasing fault responsiveness, increasing system reliability, and decreasing grid downtime. For instance, the presence of fault currents from multiple power sources may cause current control systems to misinterpret the magnitude and direction of fault current and therefore the location or existence of a fault. Furthermore, inaccurate fault detection and isolation reduces the service life of DERs. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for a microgrid control system. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
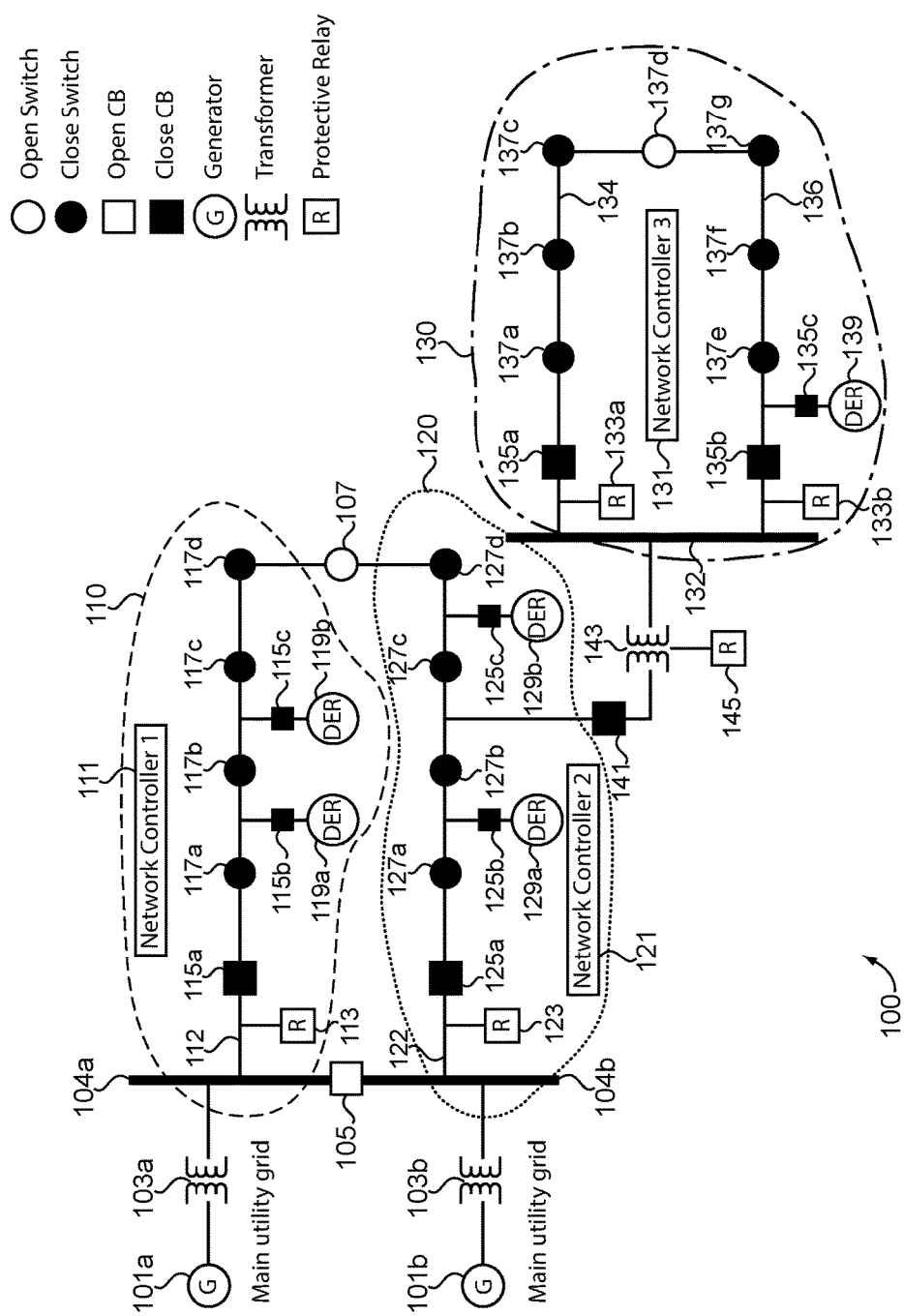
FIG. 1 illustrates an exemplary power grid.

With reference to FIG. 1 there is illustrated an exemplary electric power grid 100. The illustrated power grid 100 is a utility grid including a plurality of interconnectable small power system networks, also known as nested microgrids. Although grid 100 is illustrated with a single line diagram, power grid 100 may be structured to transmit single phase or multiphase power. It shall be appreciated that grid 100 may be implemented in a variety of applications, including power transmission systems, power distribution systems, grid connected microgrids, islanded nested microgrids, nanogrids, marine power systems, aeronautical power systems, and land vehicle power systems, to name but a few examples. Although grid 100 is an alternating current power systems, other embodiments may include direct current power systems, such as a DC power distribution system. Furthermore, it shall be appreciated that the topology of grid 100 is illustrated for the purpose of explanation and is not intended as a limitation of the present disclosure.

Grid 100 includes two primary electric power generators 101a, 101b, each structured to generate and transmit high voltage alternating current (AC) power. Generator 101a is coupled by way of a power transmission network to a substation including a transformer 103a. Generator 101b is coupled by way of a power transmission network to a substation including a transformer 103b. Transformer 103a is coupled to a first segment of a busbar 104a and transformer 103b is coupled to a second segment of a busbar 104b. It shall be appreciated that generators 101a and 101b represent one example of a power source within a utility grid not controlled by any of the network controllers. The illustrated topology of the utility grid connected to the nested microgrids of grid 100 is not intended as a limitation of the embodiment.

A circuit breaker 105 is coupled between busbar segments 104a and 104b. Circuit breaker 105 is structured to selectively allow the flow of current between busbar segment 104a and busbar segment 104b in response to an electrical fault condition within grid 100. A fault condition may be a short circuit fault or an open circuit fault. In certain embodiments, circuit breaker 105 includes an intelligent electronic device structured to measure electrical characteristics of power flowing through circuit breaker 105 and determine a fault is occurring using the measurements. In certain embodiments, circuit breaker 105 is structured to receive a signal or measurements from a network controller indicating a fault is occurring within grid 101. Circuit breaker 105 may be controlled remotely by a network controller. In other embodiments, circuit breaker 105 may be replaced with another type of protection device. As illustrated, breaker 105 is normally open. It shall be appreciated that any or all of the foregoing features of circuit breaker 105 may also be present in the switches or other circuit breakers disclosed herein.

Grid 100 includes microgrids 110, 120, and 130. The microgrids of grid 100 are arranged in a nested structure, meaning the microgrids can be connected to each other by closing switching devices within grid 100. Microgrids 110 and 120 are medium voltage distribution networks. Each microgrid is structured to receive power from an external power source, such as generators 101a or 101b, but may also be disconnected from the rest of grid 100 and operate independently using distributed energy resources (DERs) as power sources. Each of the DERs include a controller structured to communicate with a network controller so as to transmit data and receive commands. Each DER may be a photovoltaic system, a battery bank or other energy storage device, a hydroelectric power source, a wind turbine system, a diesel generator, a natural gas generator, or another system structured to transmit power to the microgrid. A DER may be structured to limit output current to a percentage of nominal current output, such as 150% of nominal current.

Microgrid 110 includes a protective relay 113, a plurality of circuit breakers 115, a plurality of switches 117, and a plurality of DERs 119. Microgrid 110 is coupled to busbar 104a and microgrid 120. Specifically, a distribution line 112, also known as a feeder, is coupled between busbar segment 104a and a tie switch 107. Circuit breaker 115a, also known as a feeder breaker, is coupled to line 112. A protective relay 113 is operatively coupled to line 112 between circuit breaker 115a and busbar 104a. Relay 113 is structured to measure electrical characteristics, such as voltage and current, of the power flowing between busbar 104a and circuit breaker 115a. In response to detecting a measurement in excess of a threshold value, protective relay 113 transmits a fault detection signal. Relay 113 is structured to receive commands from network controller 111 configured to modify settings of relay 113, such as threshold values, also known as pickup values. It shall be appreciated that any or all of the foregoing features of relay 113 may also be present in the other relays disclosed herein.

Switches 117a-d are coupled to line 112 between circuit breaker 115a and tie switch 107. Each switch is structured to open and close so as to selectively disrupt the flow of current through a portion of line 112. Each switch may also measure electrical characteristics of line 112 and transmit measurements. For example, each switch may include an internal directional fault indicator (DFI) structured to identify the direction of a fault current relative to the switch and transmit a directional fault indication message. Each switch may communicate with other devices, such as a network controller, using communication protocols such as IEC 61850 or DNP 3.0, as discussed in more detail below. For example, each switch may transmit analog and digital measurements to other devices of grid 100 and may receive open/close commands from a network controller. In certain embodiments, each switch may be a circuit breaker, a re-closer, a fault interrupter, a fault detector, or a tie-line breaker. It shall be appreciated that any or all of the foregoing features of switches 117a-d may also be present in the other switches or circuit breakers disclosed herein.

In certain embodiments, grid 100 may include a plurality of external (DFI) units. Each DFI unit is structured to detect fault and overcurrent conditions and transmit data indicating fault localization, such as the direction of a fault current. Each DFI may transmit the data to, or receive commands from, a corresponding switch or a network controller of grid 100.

DER 119a is coupled to line 112 between switch 117a and 117b. Circuit breaker 115b is coupled between DER 119a and line 112. DER 119b is coupled to line 112 between switch 117b and switch 117c. Circuit breaker 115c is coupled between DER 119b and line 112. As illustrated, the circuit breakers and switches of microgrid 110 are normally closed. Tie switch 107 is normally open.

Microgrid 120 includes a protective relay 123, a plurality of circuit breakers 125, a plurality of switches 127, and a plurality of DERs 129. Microgrid 120 is coupled to busbar segment 104b and microgrid 110. Specifically, a distribution line 122 is coupled between busbar segment 104b and tie switch 107. Circuit breaker 125a is coupled to line 122. A protective relay 123 is operatively coupled to line 122 between circuit breaker 125a and busbar segment 104b.

Switches 127a-d are coupled to line 122 between circuit breaker 125a and tie switch 107. Each switch is structured to open and close so as to selectively disrupt the flow of current through a portion of line 122. DER 129a is coupled to line 122 between switch 127a and 127b. Circuit breaker 125b is coupled between DER 129a and line 122. DER 129b is coupled to line 122 between switch 127c and switch 127d. Circuit breaker 125c is coupled between DER 129b and line 122. As illustrated, the circuit breakers and switches of microgrid 120 are normally closed.

Microgrid 130 is a low voltage distribution network coupled to microgrid 120 by way of a normally closed circuit breaker 141 and a power transformer 143. A protective relay is operatively coupled to transformer 143 and is structured to measure electrical characteristics of the power flowing through transformer 143. Microgrid 130 includes two distribution lines 134, 136 coupled to a busbar 132. Microgrid 130 also includes a pair of protective relays 133, a plurality of circuit breakers 135, a plurality of switches 137, and a DER 139.

Line 134 is coupled between busbar 132 and a tie switch 137d. Circuit breaker 135a is coupled to line 134. A protective relay 133a is operatively coupled to line 134 between circuit breaker 135a and busbar 132. Switches 137a-c are coupled to line 134 between circuit breaker 135a and tie switch 137d. Each switch is structured to open and close so as to selectively disrupt the flow of current through a portion of line 134.

Line 136 is coupled between busbar 132 and a tie switch 137d. Circuit breaker 135b is coupled to line 136. A protective relay 133b is operatively coupled to line 136 between circuit breaker 135b and busbar 132. Switches 137e-g are coupled to line 136 between circuit breaker 135b and tie switch 137d. Each switch is structured to open and close so as to selectively disrupt the flow of current through a portion of line 136. DER 139 is coupled to line 136 between breaker 135b and 137e. Circuit breaker 135c is coupled between DER 139 and line 136. As illustrated, the circuit breakers and switches of microgrid 120 are normally closed, with the exception of tie switch 137d.

Microgrids 110, 120, and 130 include network controllers 111, 121, and 131, respectively. Each network controller is structured to communicate with the protective relays, circuit breakers, DERs, and switches of its respective microgrid. Each network controller is structured to calculate the location of a fault without reconnecting healthy segments of the microgrid to the fault during the fault location process. Thus, each network controller avoids exposing a DER to a fault current when system voltages are out of range. For example, network controller 111 is structured to receive measurements of electrical characteristics of microgrid 110, determine a fault is occurring within microgrid 110, open the point of interconnection (POI) circuit breaker 115a, determine the location of the fault within microgrid 110, isolate the fault from the healthy portion of the microgrid by opening the proximite switches, monitor the status of the fault, and reconnect the healthy portion or portions of microgrid to available power sources within microgrid 110 or within other neighboring microgrids. Network controller 111 does not require a full network model of grid 100 or short-circuit analysis capability. In certain embodiments, one network controller may assume control of a second microgrid if another network controller is malfunctioning. For example, network controller 111 may perform the same functions described above with respect to microgrid 110 for microgrid 120 in response to determining network controller 121 is malfunctioning. It shall be appreciated that any or all of the foregoing features of grid 100 may also be present in the other power grid and power grid components disclosed herein.

Figure 2:
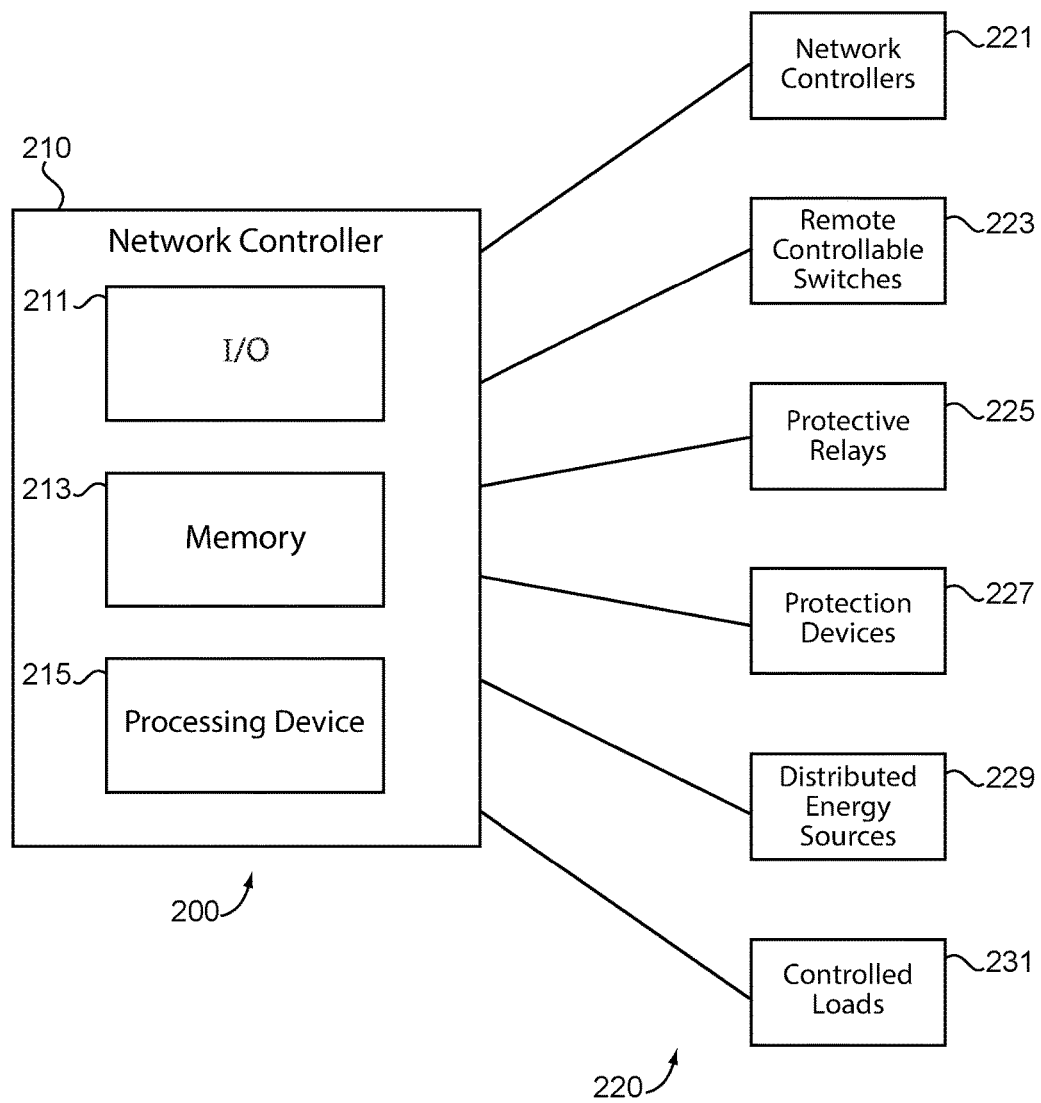
FIG. 2 is a block diagram illustrating an exemplary network controller.

With respect to FIG. 2 there is a block diagram illustrating an exemplary communication network 200. It shall be understood that the term network controller refers to a variety of microgrid control system implementations and should not be construed as limited to a particular implementation or device unless indicated to the contrary. Network 200 includes a network controller 210 in communication with a plurality of external devices 220 including other network controllers 221, remote controllable switches 223, protective relays 225, protection devices 227, DERs 229, and controlled loads 231. The plurality of external devices 220 may include any type of device that allows data to be transferred to or from network controller 210. For example, the plurality of external devices 220 may include a sensor, a time synchronization device, a mobile device, a reader device, equipment, a handheld computer, a diagnostic tool, a controller, a computer, a server, a printer, a display, an alarm, a status indicator, a keyboard, a mouse, or a touch screen display.

Network controller 210 includes an input/output device 211, a memory device 213, and a processing device 215. Input/output device 211 allows the network controller 210 to communicate with the plurality of external devices 220 by way of a wired or wireless communication channel. The data transferred between network controller 210 and devices 220 may be analog or digital. For example, input/output device 211 may be a network adapter, network card, interface, or a port (e.g., a USB port, serial port, parallel port, an analog port, a digital port, VGA, DVI, HDMI, FireWire, CAT 5, or any other type of port or interface) to name but a few examples. Input/output device 210 may transfer between network controller 210 and the plurality of external devices 220 by mapping data to one or more communication protocols including, but not limited to, IEC 61850 protocols (sampled values (SV), generic object oriented substation event (GOOSE), manufacturing message specification (MMS)); distributed network protocol (DNP 3.0); Modbus; and IEC 60870 protocols. Input/output device 211 may be comprised of hardware, software, and/or firmware. It is contemplated that input/output device 211 includes more than one of these adapters, cards, or ports.

Memory 213 may be of one or more types, such as solid-state, electromagnetic, optical, or a combination of these forms. Furthermore, memory 213 may be volatile, nonvolatile, or a combination of these types, and some or all of memory 213 may be portable, such as a disk, tape, memory stick, or cartridge, to name but a few examples. In addition, memory 213 may store data and programming instructions executable using processing device 215. For example, memory 213 may store instructions that when executed by processing device 215 perform cyber security functions, such as encrypting or authenticating data using IEC 62351 standards. The instructions may also perform measurement retrieval functions, fault detection functions, fault isolation functions, microgrid restoration functions, or time synchronization functions, to name but a few examples.

Processing device 215 may be of a programmable type, a dedicated, hardwired state machine, or a combination of these; and may further include multiple processors, Arithmetic-Logic Units (ALUs), Central Processing Units (CPUs), Digital Signal Processors (DSPs), Field-programmable Gate Array (FPGA) or the like. For forms of processing device 215 with multiple processing units, distributed, pipelined, and/or parallel processing may be utilized as appropriate. Processing device 215 may be dedicated to performance of just the operations described herein or may be utilized in one or more additional applications. In the depicted form, processing device 215 is of a programmable variety that executes algorithms and processes data in accordance with the programming instructions (such as software or firmware) stored in memory 213. Processing device 215 may be comprised of one or more components of any type suitable to process the signals received from input/output device 211 or elsewhere, and provide desired output signals. Such components may include digital circuitry, analog circuitry, or a combination of both.

Figure 3:
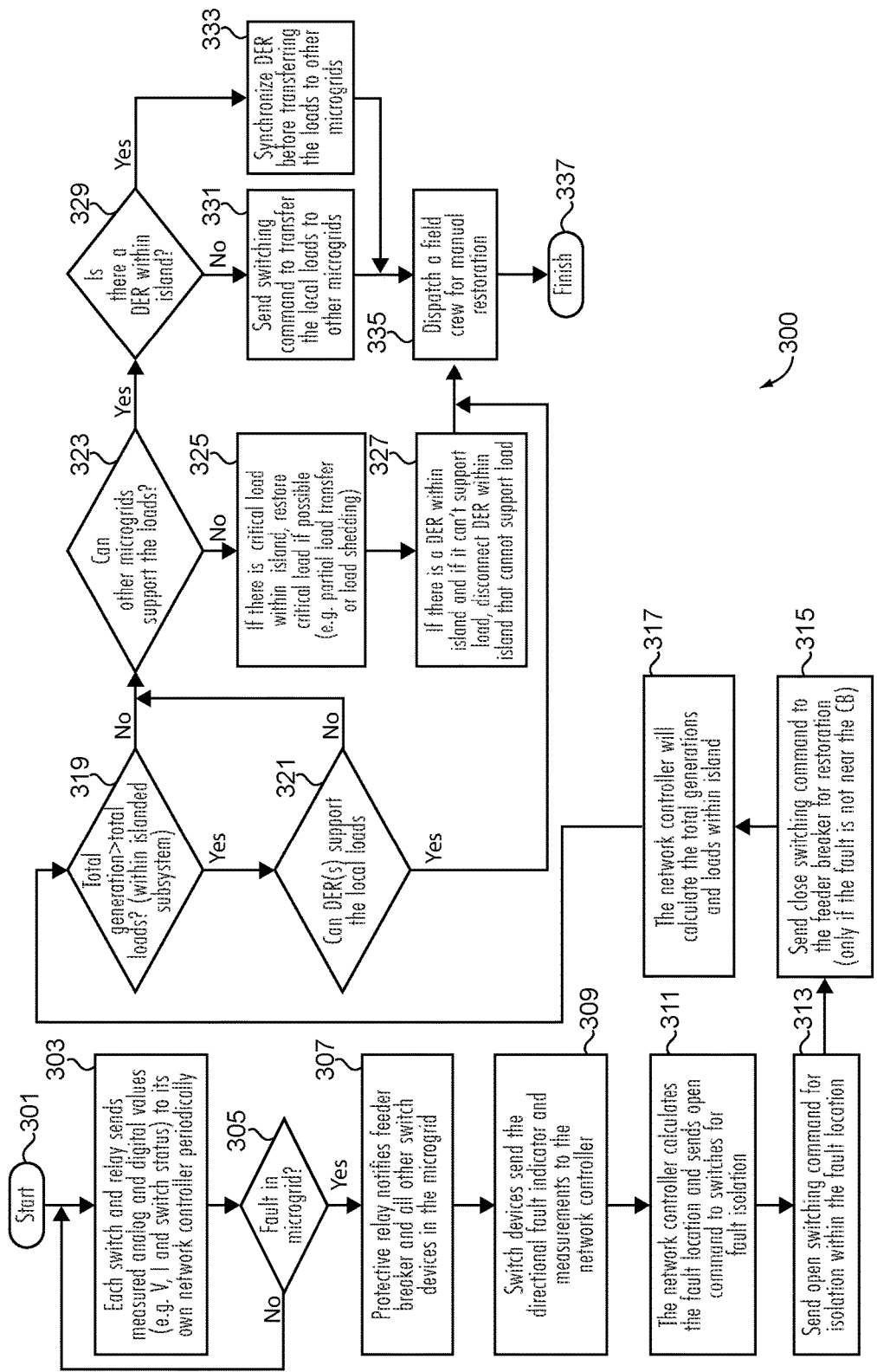
FIG. 3 is a flowchart illustrating an exemplary fault response process.

With reference to FIG. 3, there is illustrated an exemplary process 300 for operating a microgrid within a power grid. The following description of process 300 is made with reference to microgrid 110 of power grid 100 illustrated in FIG. 1. It is to be understood, however, that process 300 may be used in combination with other forms of microgrids within power grids, such as those described above with reference to FIGS. 1, 6 and 14.

Process 300 begins at start operation 301 and proceeds to operation 303 where the switching devices, DER controllers, and relay of microgrid 110 transmit data to network controller 111. The data may include voltage measurements, current measurements, and switch status. Data may be transferred to network controller 111 in response to a request by network controller 111. Data may also be sent periodically, such as every 10 milliseconds. Data may also be sent to network controller 111 in response to sudden changes in measurements, such as sudden changes in current or voltage magnitude. Network controller 111 monitors microgrid 110 for fault conditions using the received data from the switches and relay. By using data from all devices in microgrid 110, network controller 111 may detect a fault condition which could not be detected by a single device.

Process 300 proceeds to conditional 305. So long as a fault is not occurring within microgrid 110, Process returns to operation 303. Once a fault occurs, process 300 proceeds to operation 307.

During operation 307, microgrid 110 detects and responds to a fault occurring within microgrid 110. A fault may be detected by protective relay 113 or network controller 111. For example, a network controller 111 may use data from the DER controllers, such as a voltage measurement exceeding a threshold value, to detect a fault within microgrid 110. In certain embodiments, network controller 111 determines a fault is occurring by comparing the data received in operation 303 with threshold values. In response to detecting a fault, network controller 111 commands protective relay 113 to notify each switch within microgrid 110 by transmitting a notification signal. Relay 113 also transmits a trip signal to POI circuit breaker 115*a*. In response to the trip signal, circuit breaker 115*a* may open to isolate microgrid 110 during the subsequent fault location sequence. In other embodiments, network controller 111 transmits a notification signal to each switch of microgrid 110.

Process 300 proceeds to operation 309 where the switches of microgrid 110 transmit directional fault indicator and post-fault measurements to network controller 111 or another device within grid 100 in response to receiving the notification signal. The notification signal may include circuit breaker status, protective relay voltage measurements, and protective relay current measurements. The directional fault indicator identifies the direction of the current flowing through the transmitting switch.

Process 300 proceeds to operation 311 where network controller 111 calculates the location of the detected fault using the data transmitted in operation 309. Network controller 111 then isolates the fault by transmitting open commands to the proximate switches of microgrid 110. Isolating the fault may create a healthy portion of microgrid 110 that is no longer connected to the utility grid, also known as an island. The process of calculating the fault location is described in more detail below.

Process 300 proceeds to operation 313 where DERs located in the isolated fault portion of microgrid 110 are isolated from the fault. If the DER has not detected a fault due to low fault current, network controller 111 isolates any DER operating within the isolated faulted portion of microgrid 110 by transmitting an open command to the circuit breaker corresponding to the DER. The open command may be transmitted using a GOOSE communication protocol.

Once the fault is isolated from the healthy portions of grid 100, process 300 attempts to connect any islanded portion of microgrid 110 to another microgrid of grid 100 in order to reduce the effect of fault isolation on loads receiving power from microgrid 110. The portion of process 300 concerning reconnecting islanded portions of microgrid 110 to grid 100 begins when process 300 proceeds to operation 315.

During operation 315, network controller 111 reconnects a portion of microgrid 110 to grid 100 by closing circuit breaker 115*a*, provided the fault is not located in the segment of line 112 directly coupled with circuit breaker 115*a*.

Process 300 proceeds to operation 317 where the viability of any islanded portion of microgrid 110 is evaluated by network controller 111. Specifically, network controller 111 calculates the aggregated power generation of the DERs within the islanded portion of microgrid 110 and the aggregated power demand of the loads within the islanded portion of microgrid 110.

Process proceeds to conditional 319 where the calculated values from operation 317 are compared. If the aggregated power generation exceeds the aggregated power demand, process 300 proceeds to conditional 321. Otherwise, process 300 proceeds to conditional 323.

At conditional 321, network controller 111 determines whether the DERs of the islanded portion of microgrid 110 can support the loads of the islanded portion of microgrid 110. This analysis may include determining the current power output and the maximum power output of each DER. For instance, a battery energy may be charging, but is capable of outputting sufficient power to support the loads. In another example, a DER, such as a hydroelectric DER could be controlled so as to increase power output. If the DERs can support the loads of the island, the island operates independently of the power grid and process 300 proceeds to operation 335 where a field crew is dispatched to the physical location of the fault location for total system restoration. Otherwise, process 300 proceeds to conditional 323.

At conditional 323, network controller 111 communicates with the other network controllers of grid 100 to determine whether the islanded portion of microgrid 110 can be connected to one of the other microgrids. If one or more of the other microgrids has sufficient excess power capacity to provide power to the islanded portion of microgrid 110, process 300 proceeds to conditional 329. Otherwise, process 300 proceeds to 325.

During operation 325, network controller 111 identifies critical loads in the islanded portion of microgrid 110 and attempts to restore the critical loads by connecting the critical loads to another microgrid of grid 100 through partial load shedding or load shedding. A load may be classified as critical or non-critical by a system operator. When transferring the critical loads to another microgrid, any DER in the island is synchronized to the frequency and phase angle of the other microgrid by network controller 111. Operation 325 is described in more detail below.

Process 300 proceeds from operation 325 to operation 327 where any DER within the islanded portion of microgrid 110 unable to support a load is disconnected by opening a corresponding circuit breaker. Process 300 proceeds from operation 327 to operation 335.

At conditional 329, network controller 111 determines whether any DERs are operating within the island of microgrid 110. If so, process 300 proceeds to operation 333 where the DERs are synchronized with other microgrids of grid 100 and the island is connected to another microgrid of grid 100. Process 300 then proceeds from operation 333 to operation 335.

If no DERs are operating within the islanded portion of microgrid 110, process 300 proceeds from conditional 329 to operation 331 where network controller 111 connects the island of microgrid 110 to another microgrid of grid 100. Process 300 then proceeds to operation 335. Process 300 proceeds from operation 335 to end operation 337.

It shall be further appreciated that a number of variations and modifications to process 300 are contemplated including, for example, the omission of one or more aspects of process 300, the addition of further conditionals and operations and/or the reorganization or separation of operations and conditionals into separate processes.

Figure 4:
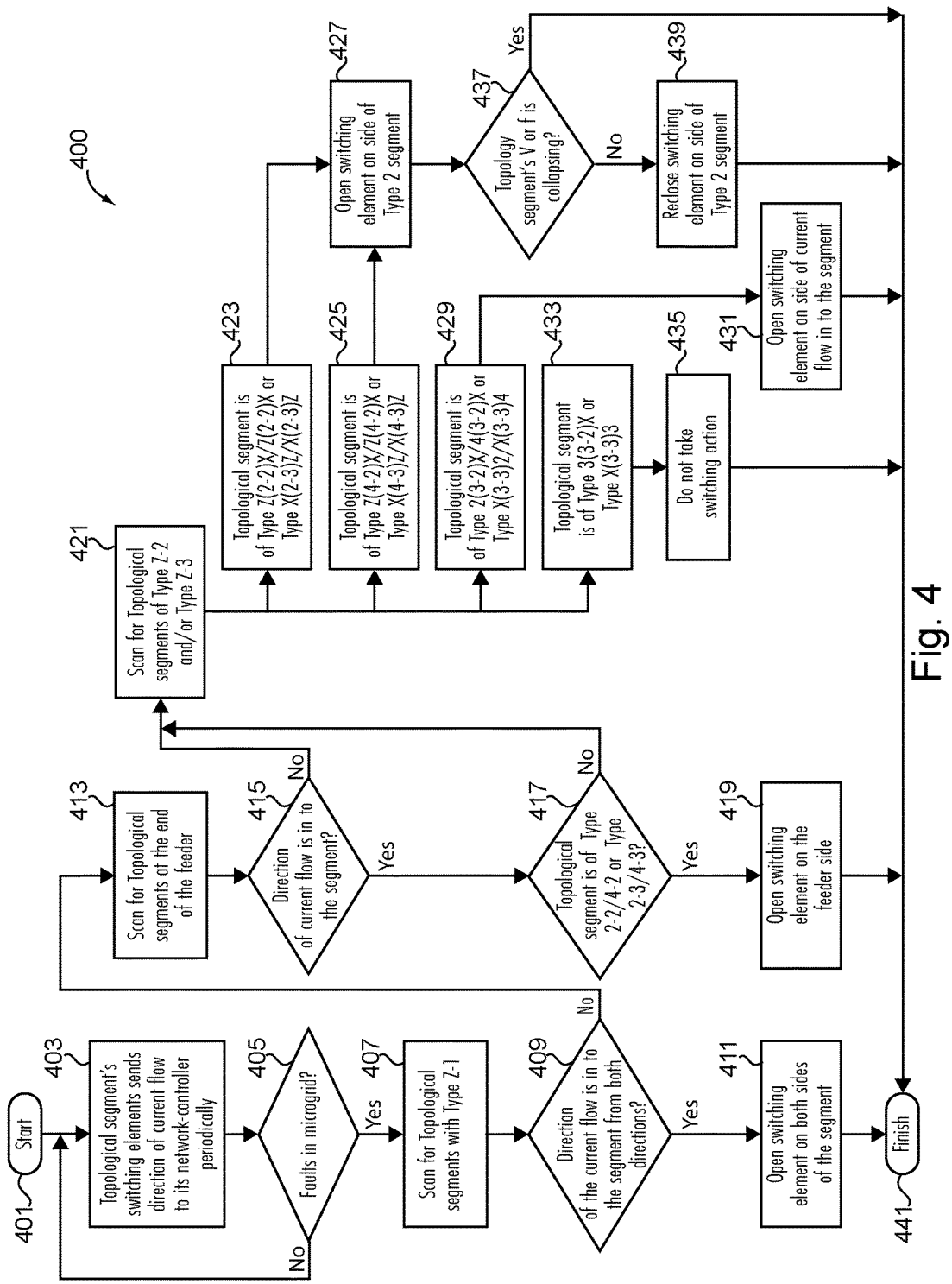
FIG. 4 is a flowchart illustrating an exemplary fault location identification process.

With reference to FIG. 4, there is illustrated an exemplary process 400 for locating and isolating a fault within a microgrid. The following description of process 400 is made with reference to microgrid 110 of power grid 100 illustrated in FIG. 1. It is to be understood, however, that process 400 may be used in combination with other forms of microgrids within power grids, such as those described above with reference to FIGS. 1, 6, and 14.

Process 400 begins at start operation 401 and proceeds to operation 403 where network controller 111 receives measurements of electrical characteristics of microgrid 110. The measurements may be sent by all switching devices and DER controllers of microgrid 110. The measurements may include switch open/close status, current magnitudes, and current direction, to name but a few examples. Each switching device may send measurements periodically or in response to a request from network controller 111. Each switching device may also transmit measurements in response to detecting sudden changes in current direction or magnitude.

Process 400 proceeds to conditional 405. If a fault is occurring in microgrid 110, process 400 proceeds to operation 407 where network controller 111 opens POI circuit breaker 115a and begins locating the fault by identifying topological and proximity classifications for each distribution line segment of microgrid 110. Otherwise, process 400 returns to operation 403 from conditional 405.

Figure 5:
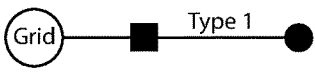
FIG. 5 is a table illustrating the topological designations used in the exemplary fault location identification process illustrated in FIG. 4.
Figure 5:
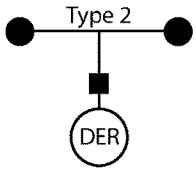
Figure 5:
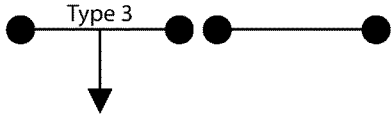
Figure 5:
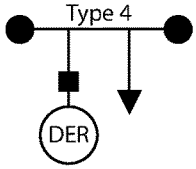
Figure 5:
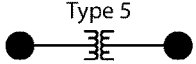

With reference to FIG. 5 there is a table 500 illustrating the exemplary topological classifications for each segment of microgrid 110. Each portion of line 112 divided by two devices, such as a switch or a circuit breaker, is considered a segment of microgrid 110. Each segment is classified based on the components coupled to the segment. For example, the segment connecting microgrid 110 to the power grid during normal operation is classified as type 1. A segment with a coupled DER is classified as type 2. A segment with a coupled load or no coupled devices is classified as type 3. A segment with a coupled load and DER is classified as type 4. A segment with a transformer is classified as type 5. The topological classification for each segment may change dynamically. For example, a battery bank may transition from a discharging state to a charging state. In this case, the battery bank transitions from a DER to a load, causing the topological classification of the coupled segment to change from a type 2 to a type 3. In another example, a DER may be disconnected from a segment with a load, causing the topological classification of the associated segment to change from a type 4 to a type 3.

Figure 6:
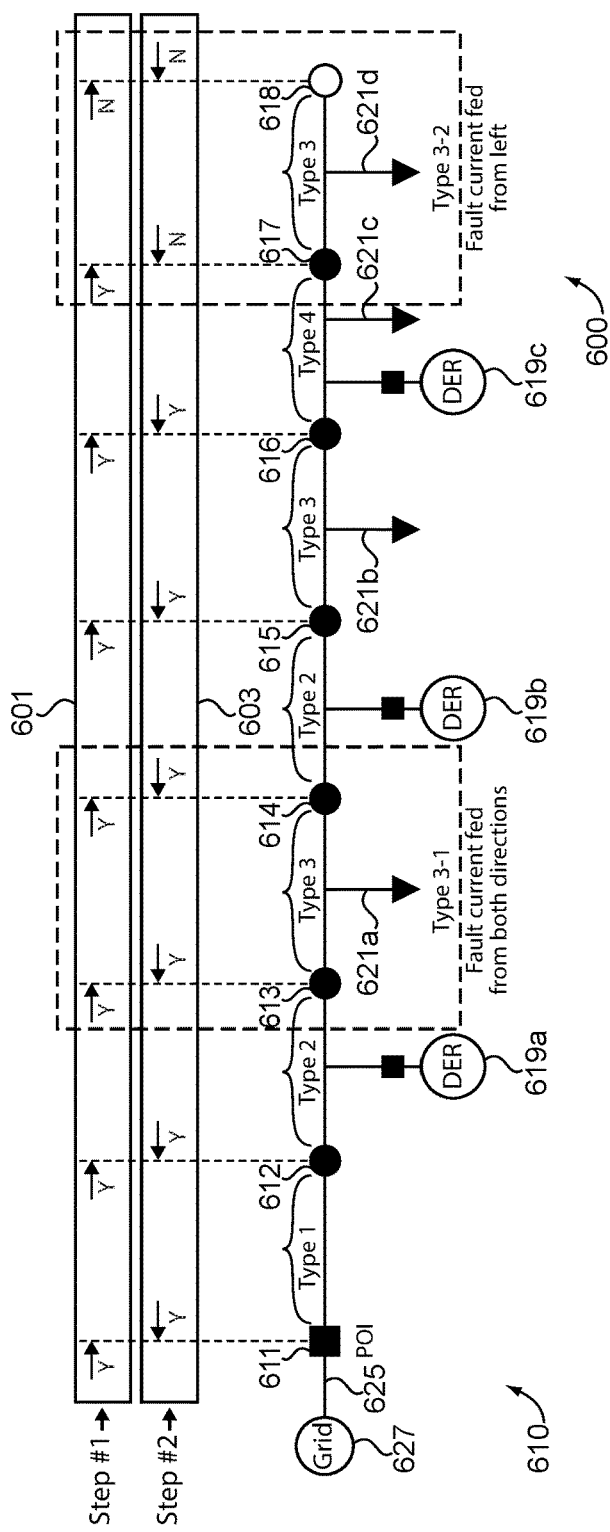
FIG. 6 illustrates an exemplary power system illustrating proximity classifications.

With respect to FIG. 6 there is an exemplary power system 600 illustrating proximity classifications. Power system 600 includes a distribution line 625 coupled between a primary power generator 627 and an open tie switch 618. Circuit breaker 611 and switches 612-617 are coupled to line 625 forming a plurality of line segments. The topological classification for each segment is identified above the segment. The segment between circuit breaker 611 and switch 612 is type 1 since it is not coupled to a load or a DER and is the closest segment to grid 627. The segment between switch 612 and switch 613 is type 2 since DER 619a is coupled to the segment. The segment between switch 613 and switch 614 is type 3 since load 621a is coupled to the segment. The segment between switch 614 and switch 615 is type 2 since DER 619b is coupled to the segment. The segment between switch 615 and switch 616 is type 3 since load 621b is coupled to the segment. The segment between switch 616 and switch 617 is type 4 since DER 619c and load 621c is coupled to the segment. The segment between switch 617 and switch 618 is type 3 since load 621d is coupled to the segment.

In addition to a topological classification, each segment receives a proximity classification. Boxes 601 and 603 illustrate the process for receiving a proximity classification. The purpose of the proximity classification is to identify the possible directions from which a fault current from a power source may enter a segment. For example, box 601 illustrates that current may enter each segment moving away from a designated point of interconnection (POI), such as circuit breaker 611, since the primary power generator 627 may provide power to each segment through circuit breaker 611. The POI represents the portion of the microgrid directly connected to the utility grid. It is important to note that if a second segment of line 625 were coupled to open switch 618, the segment would not be able to receive a fault current from the POI. Box 603 illustrates that some segments may receive fault current moving towards the POI by virtue of DERs 619a-619c. For example, each segment between circuit breaker 611 and switch 617 may receive a fault current from DER 619c. However, the segment between switches 617 and 618 cannot receive a fault current moving toward the POI. Each segment which can receive a fault current from either direction is classified as type 1. For grid connected microgrids, such as system 600, each segment which can only receive fault current moving away from the POI is classified as type 2. In other embodiments, where system 600 is operating as an island, the POI is not relevant. Therefore, each segment which can only receive fault current in one direction is classified as type 2 or type 3, depending on the direction of the fault current with respect to a reference point. For example, a segment which can receive fault current from the left may be a type 2, while another segment which can only receive fault current from the right may be a type 3.

Throughout this disclosure, the topological classification and proximity classification of each segment may be represented as "type Z-Y", where "Z" represents the topological classification and "Y" represents the proximity classification. It shall be understood that "Z" may be used as a placeholder to mean any type of topological classification, "Y" may be used as a placeholder to mean any type of proximity classification, and "type X" may be used to represent any sequence of line segments including no line segments. In some instances, "Type Z" may represent a segment with any type of proximity classification. For example, a segment classified as type Z-1 is a segment of any topological arrangement in which fault current may enter the segment moving towards and moving away from the POI.

With continuing reference to FIG. 4, once the segments of microgrid 110 are assigned topological and proximity classifications, network controller 111 identifies all segments of type Z-1 for analysis. Process 400 proceeds to conditional 409 where network controller 111 identifies any type Z-1 segments in which post fault current is entering the segment in both directions.

Figure 7:
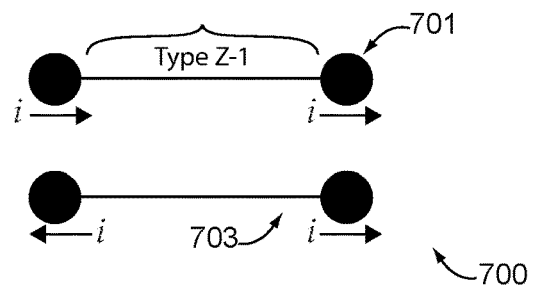
FIGS. 7-12 illustrate segment topologies and fault currents used in the exemplary fault location identification process illustrated in FIG. 4.

With reference to FIG. 7 there is illustrated a segment 700 of type Z-1 before and during a fault condition. As shown by segment 701, current is moving through the segment before a fault is detected. However, as shown by segment 703, current is moving out of the segment during a fault condition. In response to the observed current in switches coupled to segment 703, no switching action will be taken by a network controller.

Figure 9:
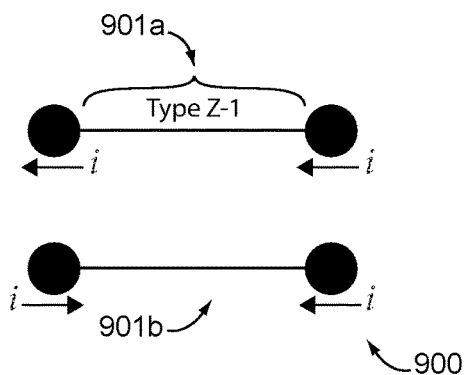

With reference to FIG. 9 there is illustrated a line segment 900 of type Z-1 before and during a fault condition. Before a fault condition, current flows through segment 900 as illustrated by segment 901a. During a fault condition, current flows into segment 900 from both directions as illustrated by segment 901b. Since current is flowing into segment 900 from both directions during a fault, network controller will open switching elements on either side of the segment to isolate the fault from the rest of the microgrid.

With continuing reference to FIGS. 4 and 9, if a line segment such as line segment 900 in FIG. 9 is identified by conditional 409 of FIG. 4, process 400 proceeds to operation 411 where the fault is isolated by opening both switching elements on either side of the line segment. Process 400 proceeds to end operation 441. If all line segments of microgrid 110 of type Z-1 do not have fault current entering the segment from both sides, such as segment 700 of FIG. 7, process 400 proceeds to operation 413.

During operation 413, network controller 111 identifies the segment at the end or ends of the distribution line. Process 400 proceeds to conditional 415 where network controller 111 analyzes the direction of the post-fault current.

Figure 8:
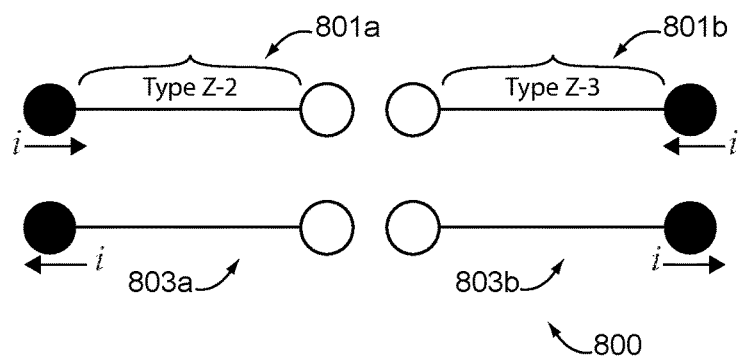

With reference to FIG. 8 there is illustrated two line segments 800 located at the end of a distribution line before and during a fault condition. Segment 801a and 803a of type Z-2 illustrates one segment receiving current before a fault condition and outputting current during a fault condition. Segment 801b and 803b of type Z-3 illustrates current flowing into a segment before a fault condition and flowing out of current during a fault condition. Since current is flowing out of the segment during a fault condition, no switching action will be taken by the network controller.

Figure 10:
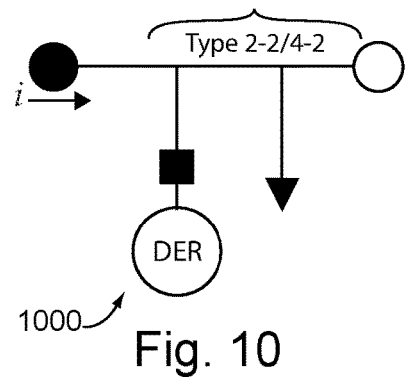

With reference to FIG. 10 there is illustrated a line segment 1000 of type 4-2 located at the end of a distribution line in which current is entering the line segment during a fault condition. Line segment 1000 may also be of type 2-2. Network controller will isolate segment 1000 by opening the closed switch since the topological classification is type 2/type 4, the segment is located at the end of the distribution line, and current is entering segment 1000 during a fault condition.

With continuing reference to FIG. 4, for each line segment identified in operation 413, if the post-fault current is leaving the line segment, such as segments 803a and 803b of FIG. 8, process 400 proceeds to operation 421. Otherwise, process 400 proceeds to conditional 417.

At conditional 417, if the segment is of the type 2-2 or type 4-2, such as line segment 1000 of FIG. 10, process 400 proceeds to operation 419 where the switch connecting the end segment to the other portion of the distribution line is opened, isolating the fault in the end of the distribution line. Process 400 proceeds to end operation 441. At conditional 417, if none of the end segments are of the type 2-2 or type 4-2, process 400 proceeds to operation 421.

During operation 421, network controller 111 identifies all line segments not at the end of the distribution line or type Z-1. Process 400 then proceeds to operations 423, 425, 429, and 433.

Figure 11:
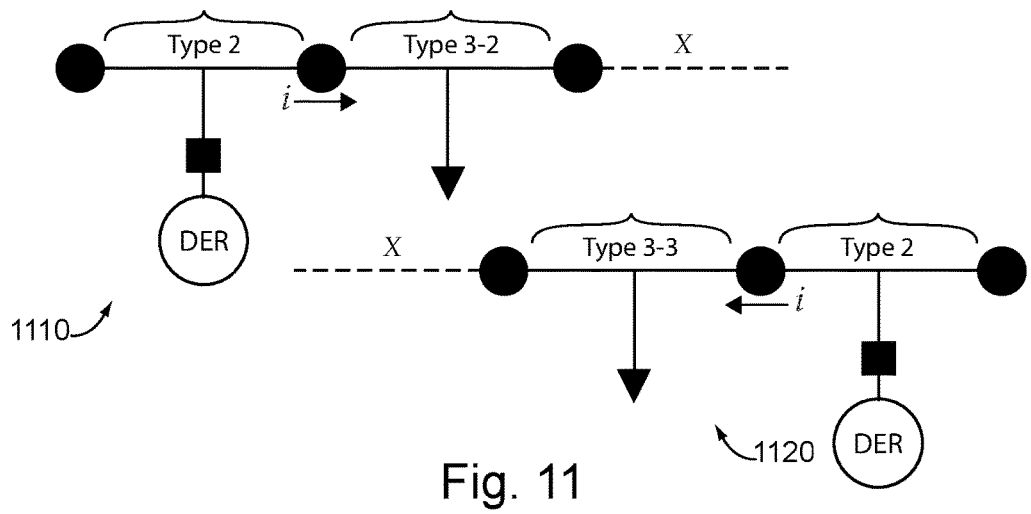

With reference to FIG. 11 there is illustrated a first plurality of line segments 1110 including a line segment of type 2, a line segment of type 3-2, and a placeholder segment "X" which includes only load segments. FIG. 11 also illustrates a second plurality of line segments 1120 including a placeholder segment "X" which includes only load segments, a line segment of type 3-3, and a line segment of type 2. If a fault is not located in a type Z-1 segment, network controller 111 will open the switch between the line segment with a DER and the first line segment of type 3-Y.

Figure 12:
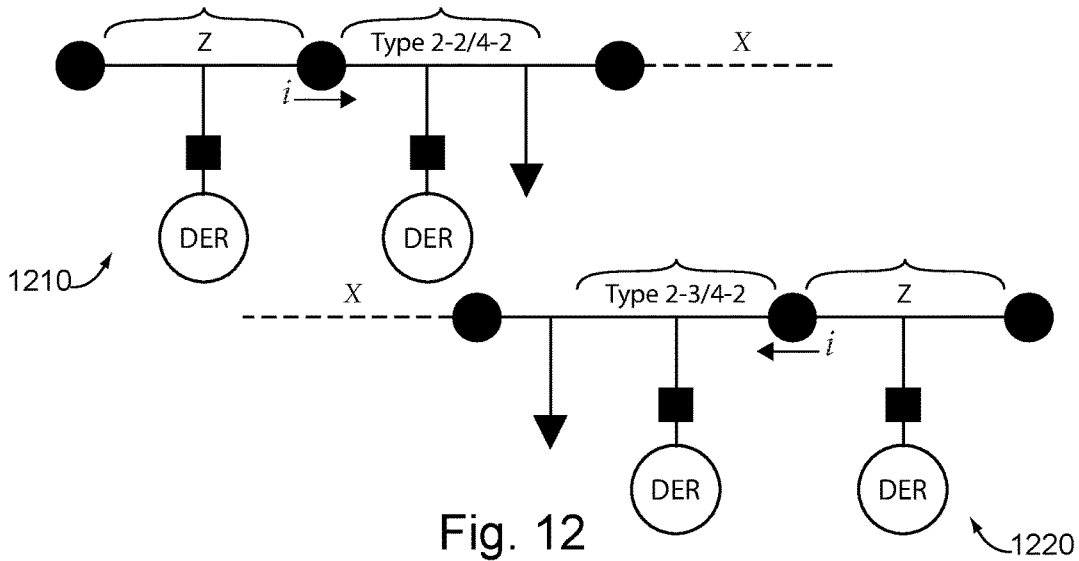

With reference to FIG. 12 there is illustrated a first plurality of line segments 1210 including a line segment of type Z, a line segment of type 4-2 or type 2-2, and a line segment placeholder "X" including only load segments. FIG. 12 also illustrates a second plurality of line segments 1220 including a line segment placeholder "X" including only load segments, a line segment of type 2-3 or type 4-3, and a line segment of type Z. If a fault is not located in a type Z-1 segment, network controller 111 will open the switch between the line segment "Z" and line segment type 2-Y or type 4-Y. Network controller 111 will monitor the isolated DER. If the voltage or frequency of the DER does not collapse, network controller will reconnect the line segment since the previous switching action incorrectly identified the location of the fault.

With continuing reference to FIG. 4, for operation 421 to operation 423, if the group or groups identified in operation 421 includes a sequence of type Z/type 2-2/type X, as illustrated in FIG. 12, process 400 proceeds to operation 427. For operation 423, if the group or groups identified in operation 421 include a sequence of type Z/type 4-2/type X, as illustrated in FIG. 12, process 400 proceeds to operation 427.

Process 400 also proceeds from operation 421 to operation 429. If the group or groups identified in operation 421 includes one of the following sequences, as illustrated in FIG. 11, process 400 proceeds to operation 431: type 2-2/type 3-2/type X or type 4-2/type 3-2/type X.

For operation 433, network controller 111 identifies group or groups identified in operation 421 with sequence type 3/type3-2/type X, or all segments near the end of the distribution line with no DERs. For this group or groups, process 400 proceeds to operation 435 where no switching action is taken. Process 400 then proceeds to end operation 441.

During operation 431, network controller 111 opens the switch between the first and second segments of the sequence, so as to separate the segment with the DER from the segment with only a load.

During operation 427, network controller 111 opens the switch between the first and second segments of the sequence, so as to isolate the segment with the DER farthest from the POI. Process 400 then proceeds to conditional 437 where the voltage and frequency output of the DER islanded in operation 427 is monitored. If the voltage and frequency are not collapsing, process 400 proceeds to operation 439 where DER segment is reconnected to the adjacent segment. Otherwise, process 400 proceeds to end operation 441.

For the purposes of illustrating process 400, assume network controller 111 is monitoring microgrid 110 of FIG. 1 while a fault occurs in the line segment between switch 117b and switch 117c. Process 400 proceeds from start operation 401 to operation 403 where network controller 111 receives measurements indicating a fault is occurring in microgrid 110. Process 400 proceeds to conditional 405 where network controller 111 detects a fault using the measurements received during operation 403. Process 400 proceeds to operation 407 where network controller 111 identifies the line segment between breaker 115a and switch 117a, as well as the line segment between switch 117a and switch 117b as type Z-1. Process 400 proceeds to conditional 409 where network controller 111 determines none of the type Z-1 segments have current entering from both directions. Process proceeds to operation 413 where network controller 111 identifies the line segment between switch 117d and tie-line switch 107 as the end of the distribution line. Process proceeds to conditional 415 where network controller 111 determines the current is flowing into the segments. Process 400 proceeds to conditional 417 where network controller 111 determines the line segment between switch 117d and tie-line switch 107 is not coupled to a DER. Process 400 proceeds to operation 421 where network controller 111 identifies the line segments between the following switches as type Z-2: 117b and 117c, 117c and 117d, and 117d and 107. Process 400 proceeds to operations 423, 425, 429, and 433 where the group of line segments is analyzed. During operation 423, network controller 111 identifies the line segment between switch 117b and 117c as type 2-2, and the line segment between switches 117a and 117b as type Z. Process 400 proceeds to operation 427 where switch 117b is opened. Process 400 then proceeds to conditional 437 where network controller 111 determines the voltage and frequency of the DER is collapsing. Before proceeding to end operation 441, network controller 111 opens breaker 115c to isolate DER 119b from the fault.

During operation 425, network controller 111 does not identify a line segment of type 4-2 so no switching action is taken in response to operation 425. During operation 429, network controller 111 identifies the line segment between switches 117b and 117c as type 2, and the line segments between switches 117c and 117d as type 3-2. Process 400 proceeds to operation 431 where network controller 111 opens switch 117c thus isolating the load segments from the last DER. Process 400 proceeds to end operation 441.

During operation 433, network controller 111 identifies the line segment between switches 117c and 117d as type 3 and the lines segment between switches 117d and 107 as type 3-2. Process proceeds to operation 435, where no switching action is taken, since switches 117d and 107 are not proximate to the fault. Process 400 proceeds to end operation 441.

During process 400, switch 117b was opened during operation 427 and switch 117c was opened during operation 431. Observing the DER coupled to the isolated segment confirmed the location of the fault. Process 400 identified the location of the fault as being between switches 117b and 117c.

It shall be further appreciated that a number of variations and modifications to process 400 are contemplated including, for example, the omission of one or more aspects of process 400, the addition of further conditionals and operations and/or the reorganization or separation of operations and conditionals into separate processes.

Figure 13:
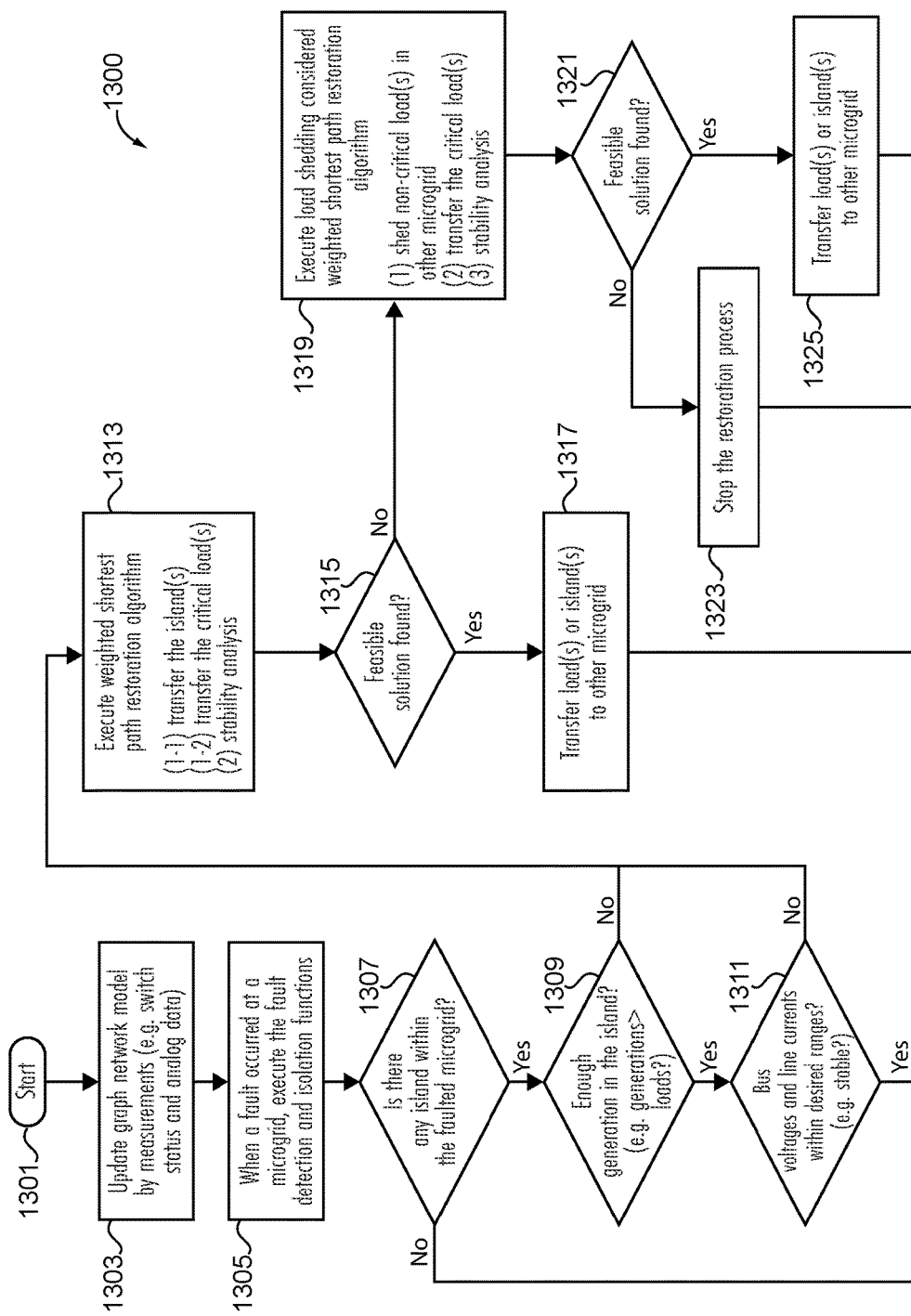
FIG. 13 is a flowchart illustrating an exemplary recovery process.

With reference to FIG. 13, there is illustrated an exemplary process 1300 for restoring an islanded portion of a microgrid within a power grid. The following description of process 1300 is made with reference to microgrid 1410 of power grid 1400 illustrated in FIG. 14. It is to be understood, however, that process 1300 may be used in combination with other forms of microgrids within power grids, such as those described above with reference to FIGS. 1, 6, and 14.

Process 1300 begins at start operation 1301 and proceeds to operation 1303 where network controller 1411 receives measurements from devices of microgrid 1410 and generates a model of microgrid 1410 using the measurements which represents values such as, but not limited to, load and DER location, line impedance, and current circuit breaker status. In certain embodiments, the model is a graph network model. In certain embodiments, network controller 1411 shares the generated model of microgrid 1410 with the other network controllers in case network controller 1411 malfunctions and one of the other network controllers must operate microgrid 1410 as a backup controller.

Process 1300 proceeds to operation 1305 where network controller 1411 detects, locates, and isolates a fault in the microgrid 1410. Process 1300 proceeds to conditional 1307 where network controller 1411 identifies any island within the faulted microgrid 1410 created by the isolation functions of operation 1305. If operation 1305 has not created an island, process 1300 proceeds to end operation 1327.

If operation 1305 creates an island, process 1300 proceeds to conditional 1309 where the total power generation of the DERs within the island are compared to the total power demand of the loads of the island. If the total power generation exceeds the total power demand, process 1300 proceeds from conditional 1309 to conditional 1311. If the total power generation does not exceed the total power demand, process 1300 proceeds to operation 1313.

At conditional 1311, network controller 1411 determines whether the island is stable. For example, network controller 1411 compares bus voltages and line currents of the island to acceptable ranges so as to determine whether the island is stable. In certain embodiments, stability analysis includes determining whether unsafe power swings or further cascading collapse would occur if the island were connected to a healthy microgrid. If the island is stable, process 1300 proceeds to end operation 1327 and the island operates independently.

If the island is not stable, process 1300 proceeds to operation 1313 where network controller 1411 attempts to identify another microgrid to connect to the island in order to restore the island to normal operation. When network controller 1411 identifies more than one microgrid to be coupled, network controller 1411 is structured to determine the optimal microgrid to connect to the island, including DERs and loads, using a weighted shortest path restoration algorithm. The algorithm takes into consideration voltage profiles of the healthy microgrids and estimates possible voltage drops and current flow in the event the healthy microgrid were connected to the island. The addition of the disrupted loads during restoration may cause bus voltages to sag even further leading to undervoltage issues. The algorithm therefore, seeks to identify the particular microgrid with the higher per unit voltage at the end of its distribution line.

Network controller 1411 begins by receiving data from other network controllers 1421, 1431, and 1441. The data may include available power capacity, output voltage of the closest bus to the island, and line impedance between the microgrid and the island. Network controller 1411 calculates a weighting factor of each restoration path from the island to the microgrid using the following formula where $W_{MGi}$ is the calculated weight from the island to the i-th microgrid, $V_{CB}^{MGi}$ is the output voltage of the i-th microgrid, and $Z_{n-m}^{MGi}$ is the impedance of the restoration path between the i-th microgrid and the island.

$$W_{MGi} = \left(\frac{1}{V_{CB}^{MGi}}\right) \times Z_{n-m}^{MGi} \tag{1}$$

Network controller 1411 determines the optimal restoration path by comparing the weighting factors. Using graph theory, network controller 1411 may determine the shortest weighted path for island restoration. In certain embodiments, network controller 1411 uses Dijkstra's algorithm to calculate the optimal restoration path. Dijkstra's algorithm is based on identifying a path for restoration having the least non-negative weight.

If network controller 1411 cannot connect the entire island to another microgrid, network controller 1411 then attempts to connect the critical loads of the island to another microgrid by shedding the non-critical loads of the island. Network controller 1411 identifies loads within the island designated as critical loads. A load may be directly designated as a critical load by a user or may be indirectly designated as a critical load by applying a set of rules to characteristics of loads in order to identify high priority loads. In certain embodiments, multiple classification levels may be used to designated the importance of a load with critical load and non-critical load being broken down into a spectrum of classifications.

If network controller 1411 has found any microgrid with excess power capacity greater than the power demand of the island, network controller 1411 will perform stability analysis, such as the analysis described with respect to conditional 1311.

Process 1300 proceeds to conditional 1315 where network controller 1411 determines whether the island can be connected to another microgrid using the analysis performed in operation 1313. If a connection solution is found, process 1300 proceeds to operation 1317 where the solution is executed and the island is restored. Process 1300 proceeds to end operation 1327.

If no connection solution is found, process 1300 proceeds from conditional 1315 to operation 1319, where network controller 1411 attempts to connect the island to another microgrid by shedding non-critical loads in the other microgrid. Operation 1319 also includes performing the weighted shortest path restoration algorithm described with respect to operation 1313 as well as performing stability analysis.

Process 1300 proceeds to conditional 1321 where network controller 1411 determines whether the island can be connected to another microgrid using the analysis performed in operation 1319. If network controller 111 identifies a solution, process 1300 proceeds to operation 1325 where the solution is executed and the critical loads of the island and microgrid are powered. If a solution cannot be found, process 1300 proceeds from conditional 1321 to operation 1323, where the island is not reconnected. Process 1300 proceeds to end operation 1327.

It shall be further appreciated that a number of variations and modifications to process 1300 are contemplated including, for example, the omission of one or more aspects of process 1300, the addition of further conditionals and operations and/or the reorganization or separation of operations and conditionals into separate processes.

Figure 14:
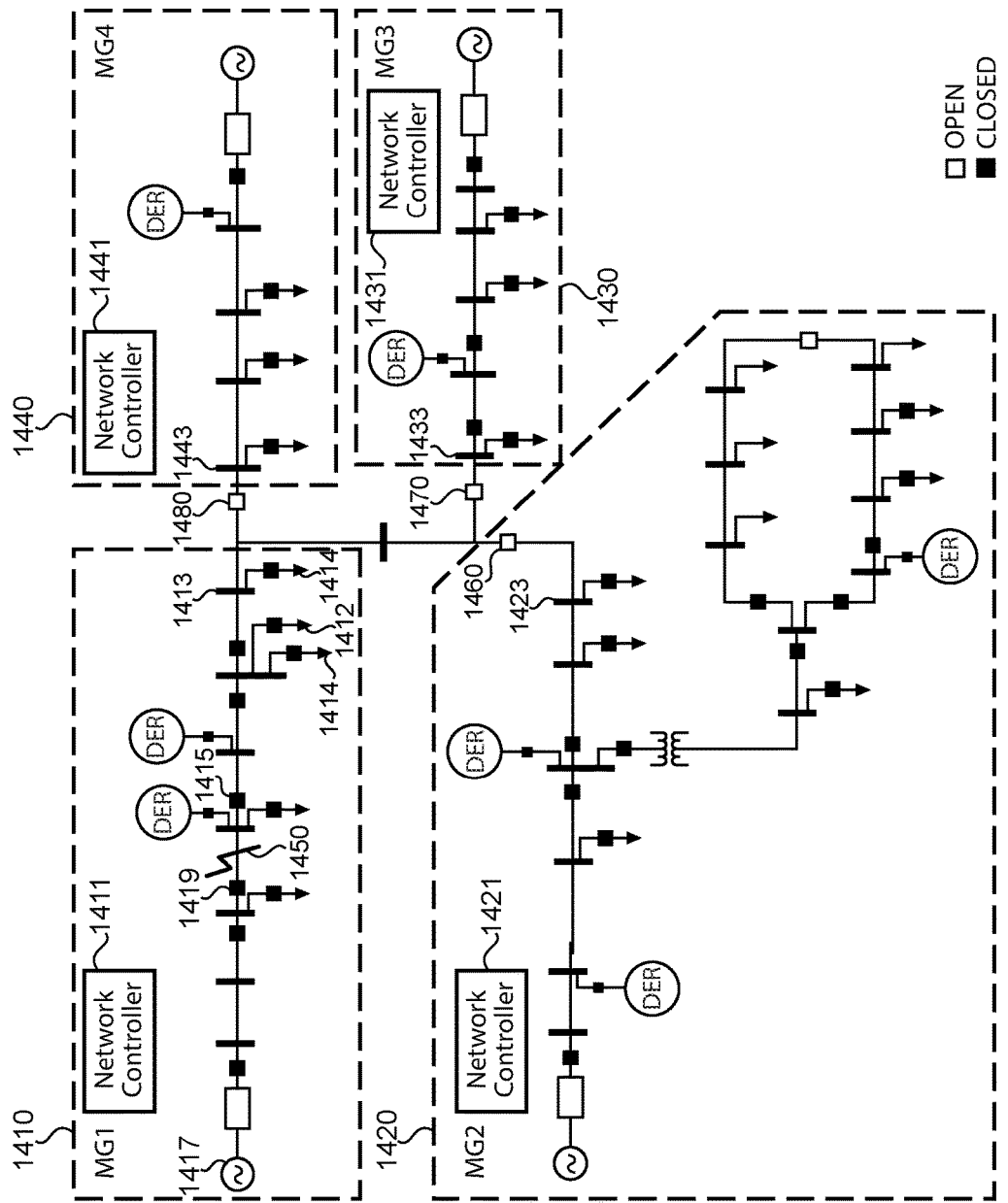
FIG. 14 illustrates another exemplary power grid.

With reference to FIG. 14 there is an exemplary power grid 1400 in normal operation before responding to a fault condition 1450. Power grid 1400 includes a plurality of microgrids. Each of microgrids 1410, 1420, 1430, and 1440 includes a network controller 1411, 1421, 1431, and 1441 respectively. Each of microgrids 1410, 1420, 1430, and 1440 includes a bus 1413, 1423, 1433, and 1443 respectively. Microgrid 1420 is connectable to microgrid 1410 by way of a circuit breaker 1460. Microgrid 1430 is connectable to microgrid 1410 by way of a circuit breaker 1470. Microgrid 1440 is connectable to microgrid 1410 by way of a circuit breaker 1480.

For the purpose of illustrating process 1300 of FIG. 13 using grid 1400 of FIG. 14, consider the following example where a fault 1450 has occurred. Process 1300 begins at start operation 1301 and proceeds to operation 1303 where network controller 1411 receives measurements from measurement devices of microgrid 1410 coupled to primary power source 1417. Process 1300 proceeds to operation 1305 where fault 1450 is isolated by opening circuit breakers 1415 and 1419. Process 1300 proceeds to conditional 1307 which determines an island, including the portion of the distribution line and all coupled DERs and loads between breaker 1415 and bus 1413, was created during the fault isolation operation. While the fault is being cleared, the island would normally be inactive. The time duration of restoration can be long depending on the extent of the damage and the availability of field crew personnel. If the duration of the outage is too long, utilities may be penalized in the form of fines or reduced reliability indices. Instead of waiting for a fault clearance to reconnect the island, process 1300 attempts to self-heal, or connect the island to one of the adjacent microgrids.

Process 1300 proceeds to conditional 1309, which determines the power generated by the DER of the island is less than the power demand of a critical load 1412 and non-critical loads 1414 within the island. Process 1300 proceeds to operation 1313 where network controller 1411 determines whether microgrids 1420, 1430, or 1440 could be connected to the island in order to restore the island. Assuming microgrids 1420, 1430, or 1440 have excess capacity greater than the total power demand of the island, operation 1313 considers the output voltages of the microgrids as well as the estimated voltage drop between the microgrid and the island. Network controller 1411 calculates the weighting factor for each possible restoration path using equation (1), output voltages obtained from the other network controllers, and estimated impedance values. The restoration path corresponding to the smallest weighting factor is the optimal restoration path. Operation 1313 identifies the optimal restoration path as the path between microgrid 1440 and the island; however the island may only be connected to microgrid 1440 if non-critical loads 1414 are shed before connecting the island and microgrid 1440. Stability analysis indicates connecting the island to microgrid 1440 would be unsafe.

Process 1300 proceeds to conditional 1315 before proceeding to operation 1319. During operation 1319, network controller 1411 receives information regarding load classifications from the other network controllers. Network controller 1411 again uses the weighted shortest path algorithm to determine the optimal restoration path, but this time factors in shedding non-critical loads in the healthy microgrids and the island. Operation 139 identifies the restoration path between microgrid 1430 and the island as the optimal restoration path. Process 1300 proceeds to conditional 1321 where network controller determines the optimal restoration path is a feasible solution. Process 1300 proceeds to operation 1325 where circuit breaker 1470 is closed to connect microgrid 1430 to the island, restoring the island before field crew personnel clear fault 1450.

Further written description of a number of exemplary embodiments shall now be provided. One embodiment is a microgrid comprising a plurality of switching devices; a plurality of distribution line segments, each distribution line segment coupled to at least one switching device of the plurality of switching devices; a plurality of measuring devices, each measuring device corresponding to one of the plurality of switching devices; and at least one distributed energy resource (DER) coupled to one of the plurality of distribution line segments; a network controller configured to receive measurements from the plurality of measurement devices, determine a fault is occurring within the microgrid using the measurements, assign a topology classification to each of the plurality of distribution line segments based on whether a load or a DER is coupled to the distribution line segment following the determining a fault is occurring, assign a proximity classification to each of the plurality of distribution line segments based on whether a fault current may flow through the distribution line segment in one direction or two directions following the determining a fault is occurring, determine fault location using the topology classification and the proximity classification, and isolate the fault by transmitting open commands at least one of the plurality of switching devices closest to the fault.

In certain forms of the foregoing microgrid, each of the plurality of measuring devices comprises a directional fault indicator. In certain forms, each of the plurality of measuring devices is incorporated into a corresponding switch of the plurality of switching devices. In certain forms, the network controller is configured to receive measurements including an open/close switch status for each of the plurality of switching devices. In certain forms, the network controller is configured to assign a topological classification by determining an operational status of each DER coupled to the distribution line. In certain forms, the network controller is configured to classify each of the plurality of distribution line segments based on whether a load or a DER is coupled to the distribution line segment includes classifying a line segment as having neither a coupled load nor a coupled DER. In certain forms, the network controller determines the location of the fault within a line segment with a proximity classification indicating fault current may flow into the line segment from two directions by determining fault current is flowing into the line segment in two directions. In certain forms, the network controller assigns a topological classification to one distribution line segment of the plurality of distribution line segments indicating a DER is coupled to the distribution line segment and the distribution line segment is only coupled to one distribution line segment by way of one switching device of the plurality of switching devices, and wherein the network controller isolates the fault by opening the one switching device in response to determining current is flowing into the one line segment of the plurality of line segments. In certain forms, the network controller determines the proximity classifications of a portion of the plurality of distribution line segments indicate fault current may flow through the portion of the plurality of distribution line segments in one direction, determines one topology classification of the portion of the plurality of distribution line segments indicates a DER is coupled to one of the distribution lines segments of the portion, and opens the switching device between the distribution line segment coupled to the DER and the remaining distribution line segments of the portion of the plurality of distribution line segments. In certain forms, the network controller is configured to receive measurements from a portion of the plurality of switching devices corresponding to a power output of the DER coupled to the one of the distribution lines segments of the portion, and close the switching device between the distribution line segment coupled to the DER and the remaining distribution line segments of the portion of the plurality of distribution line segments in response to determining a voltage or power frequency of the power output of the DER is not collapsing. In certain forms, the network controller determines the proximity classifications of a portion of the plurality of distribution line segments indicates fault current may flow through the portion of plurality of distribution line segments in one direction, determines one topology classification of the portion of the plurality of distribution line segments indicates a DER is coupled to one of the distribution lines segments of the portion, and opens the switching device between the distribution line segment coupled to the DER and the remaining distribution line segments of the portion of the plurality of distribution line segments.

Another exemplary embodiment is a method for detecting and isolating a fault condition in a microgrid comprising operating a plurality of switching devices coupled between a plurality of line segments with a network controller; receiving measurements from the plurality of switching devices with the network controller; determining a fault is occurring within the microgrid using the measurements with the network controller; assigning a topology classification to each of the plurality of line segments based on whether a load or a distributed energy resource (DER) is coupled to the line segment; assigning a proximity classification to each of the plurality of line segments based on whether a fault current may flow through the line segment in one direction or two directions; determining the location of the fault condition using the topology classifications and the proximity classifications of the plurality of line segments; and isolating the location of the fault in response to determining the location of the fault condition with a portion of the plurality of switching devices.

In certain forms of the foregoing method, determining the location of the fault condition includes identifying each line segment with a two direction current proximate classification; determining whether current is entering the line segment in two directions; and identifying the location of the fault condition in response to determining current is entering the line segment in two directions. In certain forms, determining the location of the fault condition includes identifying each line segment with a one direction current proximate classification, a DER topology classification, coupled to only one of the plurality of switching devices; determining whether current is entering the line segment; and identifying the location of the fault condition in response to determining current is entering the line segment. In certain forms, determining the location of the fault condition includes identifying each line segment with a one direction current proximate classification and coupled to at least two of the plurality of switching devices, and determining whether one of the line segments has a DER topology classification; and isolating the location of the fault includes opening the switching device coupled to the DER topology classification through which current is flowing into the segment. In certain forms, determining the location of the fault condition includes identifying each group of two line segments with a one direction current proximate classifications, coupled to at least two of the plurality of switching devices, and including one line segment with a DER topology classification; and wherein isolating the location of the fault includes opening the switching device coupled between the line segment with the DER topology classification and the other line segment.

A further exemplary embodiment is a network controller comprising an input/output device structured to communicate with a plurality of switching devices of a microgrid including a distribution line divided into a plurality of line segments by the plurality of switching devices operatively coupled to the distribution line; a microprocessor-based processing device; and a non-transitory memory device structured to store data received with the input/output device and instructions configured to perform the following functions when executed by the processing device: receive measurements from the plurality of switching devices, determine a fault is occurring within the microgrid using the measurements, assign a topology classification to each of the plurality of line segments based on whether a load or a distributed energy resource (DER) is coupled to the line segment, assign a proximity classification to each of the plurality of line segments based on whether a fault current may flow through the line segment in one direction or two directions, determine the location of a fault condition using the topology classifications and the topology classifications of the plurality of line segments, and isolate the location of the fault in response to determining the location of the fault condition by transmitting an open command to a portion of the plurality of switching devices.

In certain forms of the foregoing network controller, the proximity classification indicates whether each line segment may receive fault current from one direction or two direction, and wherein the topology classification indicates whether each line segment is coupled to a DER, a load, a transformer, or is coupled to a switching device directly connected to a utility grid. In certain forms, the distribution line includes an end line segment coupled to only one other line segment, and wherein the network controller determines the location of the fault by determining the topology classification indicates the end line segment includes a DER and determining current is entering the end line segment. In certain forms, determining the location of a fault condition includes identifying each line segment with a one direction current proximate classification and coupled to at least two of the plurality of switching devices; and determining whether one of the line segments has a DER topology classification, and wherein isolating the location of the fault includes opening the switching device coupled to the line segment with the DER topology classification through which current is flowing into the segment.

It is contemplated that the various aspects, features, processes, and operations from the various embodiments may be used in any of the other embodiments unless expressly stated to the contrary. Certain operations illustrated may be implemented by a computer or an embedded system executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A microgrid comprising:
   a plurality of switching devices;
   a plurality of distribution line segments, each distribution line segment coupled to at least one switching device of the plurality of switching devices;
   a plurality of measuring devices, each measuring device corresponding to one of the plurality of switching devices; and
   at least one distributed energy resource (DER) coupled to one of the plurality of distribution line segments;
   a network controller configured to:
      receive measurements from the plurality of measurement devices,
      determine a fault is occurring within the microgrid using the measurements,
      assign a topology classification to each of the plurality of distribution line segments based on whether a load or a DER is coupled to the distribution line segment following the determining a fault is occurring,
      assign a proximity classification to said each of the plurality of distribution line segments based on whether a fault current may flow through the distribution line segment in one direction or two directions following the determining a fault is occurring,
      determine fault location using the topology classification and the proximity classification, and
      isolate the fault by transmitting open commands at least one of the plurality of switching devices closest to the fault.

2. The microgrid of claim 1 wherein each of the plurality of measuring devices comprises a directional fault indicator.

3. The microgrid of claim 1 wherein each of the plurality of measuring devices is incorporated into a corresponding switch of the plurality of switching devices.

4. The microgrid of claim 1 wherein the network controller is configured to receive measurements including an open/close switch status for each of the plurality of switching devices.

5. The microgrid of claim 1 wherein the network controller is configured to assign a topological classification by determining an operational status of each DER coupled to the distribution line.

6. The microgrid of claim 1 wherein the network controller is configured to classify each of the plurality of distribution line segments based on whether a load or a DER is coupled to the distribution line segment includes classifying a line segment as having neither a coupled load nor a coupled DER.

7. The microgrid of claim 1 wherein the network controller determines the location of the fault within a line segment with a proximity classification indicating fault current may flow into the line segment from two directions by determining fault current is flowing into the line segment in two directions.

8. The microgrid of claim 1 wherein the network controller assigns a topological classification to one distribution line segment of the plurality of distribution line segments indicating a DER is coupled to the distribution line segment and the distribution line segment is only coupled to one distribution line segment by way of one switching device of the plurality of switching devices, and wherein the network controller isolates the fault by opening the one switching device in response to determining current is flowing into the one line segment of the plurality of line segments.

9. The microgrid of claim 1 wherein the network controller determines the proximity classifications of a portion of the plurality of distribution line segments indicate fault current may flow through the portion of the plurality of distribution line segments in one direction, determines one topology classification of the portion of the plurality of distribution line segments indicates a DER is coupled to one of the distribution lines segments of the portion, and opens the switching device between the distribution line segment coupled to the DER and the remaining distribution line segments of the portion of the plurality of distribution line segments.

10. The microgrid of claim 9 wherein the network controller is configured to receive measurements from a portion of the plurality of switching devices corresponding to a power output of the DER coupled to the one of the distribution lines segments of the portion, and close the switching device between the distribution line segment coupled to the DER and the remaining distribution line segments of the portion of the plurality of distribution line segments in response to determining a voltage or power frequency of the power output of the DER is not collapsing.

11. The microgrid of claim 1 wherein the network controller determines the proximity classifications of a portion of the plurality of distribution line segments indicates fault current may flow through the portion of plurality of distribution line segments in one direction, determines one topology classification of the portion of the plurality of distribution line segments indicates a DER is coupled to one of the distribution lines segments of the portion, and opens the switching device between the distribution line segment coupled to the DER and the remaining distribution line segments of the portion of the plurality of distribution line segments.

12. A method for detecting and isolating a fault condition in a microgrid comprising:
operating a plurality of switching devices coupled between a plurality of line segments with a network controller;
receiving measurements from the plurality of switching devices with the network controller;
determining a fault is occurring within the microgrid using the measurements with the network controller;
assigning a topology classification to each of the plurality of line segments based on whether a load or a distributed energy resource (DER) is coupled to the line segment;
assigning a proximity classification to said each of the plurality of line segments based on whether a fault current may flow through the line segment in one direction or two directions;
determining the location of the fault condition using the topology classifications and the proximity classifications of the plurality of line segments; and
isolating the location of the fault in response to determining the location of the fault condition with a portion of the plurality of switching devices.

13. The method of claim 12 wherein determining the location of the fault condition includes:
identifying each line segment with a two direction current proximate classification;
determining whether current is entering the line segment in two directions; and
identifying the location of the fault condition in response to determining current is entering the line segment in two directions.

14. The method of claim 13 wherein determining the location of the fault condition includes:
identifying each line segment with a one direction current proximate classification, a DER topology classification, coupled to only one of the plurality of switching devices;
determining whether current is entering the line segment; and
identifying the location of the fault condition in response to determining current is entering the line segment.

15. The method of claim 14 wherein determining the location of the fault condition includes:
identifying each line segment with a one direction current proximate classification and coupled to at least two of the plurality of switching devices, and determining whether one of the line segments has a DER topology classification; and
wherein isolating the location of the fault includes opening the switching device coupled to the DER topology classification through which current is flowing into the segment.

16. The method of claim 15 wherein determining the location of the fault condition includes identifying each group of two line segments with a one direction current proximate classifications, coupled to at least two of the plurality of switching devices, and including one line segment with a DER topology classification; and
wherein isolating the location of the fault includes opening the switching device coupled between the line segment with the DER topology classification and the other line segment.

17. A network controller comprising:
an input/output device structured to communicate with a plurality of switching devices of a microgrid including a distribution line divided into a plurality of line segments by the plurality of switching devices operatively coupled to the distribution line;
a microprocessor-based processing device; and
a non-transitory memory device structured to store data received with the input/output device and instructions configured to perform the following functions when executed by the processing device:
receive measurements from the plurality of switching devices,
determine a fault is occurring within the microgrid using the measurements,
assign a topology classification to each of the plurality of line segments based on whether a load or a distributed energy resource (DER) is coupled to the line segment,
assign a proximity classification to said each of the plurality of line segments based on whether a fault current may flow through the line segment in one direction or two directions,
determine the location of a fault condition using the topology classifications and the topology classifications of the plurality of line segments, and
isolate the location of the fault in response to determining the location of the fault condition by transmitting an open command to a portion of the plurality of switching devices.

18. The network controller of claim 17 wherein the proximity classification indicates whether each line segment may receive fault current from one direction or two direction, and wherein the topology classification indicates whether each line segment is coupled to a DER, a load, a transformer, or is coupled to a switching device directly connected to a utility grid.

19. The network controller of claim 18 wherein the distribution line includes an end line segment coupled to only one other line segment, and wherein the network controller determines the location of the fault by determining the topology classification indicates the end line segment includes a DER and determining current is entering the end line segment.

20. The network controller of claim 19 wherein determining the location of a fault condition includes identifying each line segment with a one direction current proximate classification and coupled to at least two of the plurality of switching devices; and determining whether one of the line segments has a DER topology classification, and wherein isolating the location of the fault includes opening the switching device coupled to the line segment with the DER topology classification through which current is flowing into the segment.

* * * * *